Patented June 27, 1950

2,513,173

UNITED STATES PATENT OFFICE 2,513,173

4.4-DIPHENYL-6-MORPHOLINO-HEPTA-NONE-3 AND ACID SALTS THEREOF

Benjamin Arthur Hems, Northolt, and Joseph Elks, London, England, assignors to Glaxo Laboratories Limited, Greenford, England, a British company No Drawing. Application February 16, 1948, Serial No. 8,738. In Great Britain February 27, 1947

3 Claims. (Cl. 260—247.7)

This invention is concerned with the provision of certain novel compounds having analgesic properties.

It heretofore had been known that basic esters of the general formula

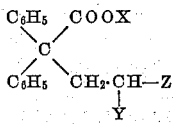

where

X represents an alkyl or aralkyl radical,
Y represents H or an alkyl group, and
Z represents a di-alkylamine, are useful as analgesics.

We have now found that the water-soluble acid addition salts of the ketone of the formula

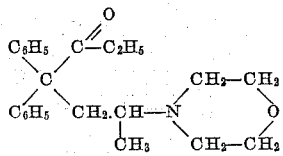

are considerably more effective as analgesics, and are substantially less toxic, than the aforesaid basic esters.

We have found, also, that the ketone base of these improved analgesics readily can be prepared by treating the corresponding nitrile, i. e., 2:2-diphenyl-4-morpholinovaleronitrile, with a substantial excess, preferably with 2 or more mols per each mol of the nitrile, of a Grignard reagent of the group consisting of ethyl magnesium chloride, ethyl magnesium bromide and ethyl magnesium iodide, in an inert solvent medium having a boiling point not substantially less than 100° C. By "inert" is here meant a substantially non-aqueous organic solvent medium which is substantially non-reactive towards the other ingredients of the reaction mixture, examples being toluene, benzene, and di-n-butyl ether. The reaction is preferably effected by heating the mixture for several hours at temperatures between 75° and 120° C.

The new ketone prepared in accordance with the present invention is generally used in the form of its water-soluble salts, e. g., the hydrochloride or sulphate. Consequently, the product is normally prepared in the form of its water soluble salts without isolating the free ketone.

The invention will now be described in greater particularity, with reference to the following illustrative example:

EXAMPLE 4-4-DIPHENYL-6-MORPHOLINOHEPTAN-3-ONE (a) *From pure 2:2-diphenyl-4-morpholinovaleronitrile*

A Grignard reagent was prepared from magnesium (2.0 g.) ethyl iodide (12.6 g.) and dry ether (30 c. c.). A solution of 2:2-diphenyl-4-morpholinovaleronitrile (12.9 g.) (prepared as described in the immediately following paragraph) in dry toluene (32 c. c.) was added, the ether was distilled off from a water-bath and the residue was heated on the water-bath for about 16 hours. The reaction mixture was decomposed by warming on the water-bath with 2 N-hydrochloric acid (200 c. c.). The toluene layer was separated and extracted with 2 N-hydrochloric acid. The combined acid extracts were made strongly alkaline with 40% sodium hydroxide and extracted with benzene. The benzene extract was dried over potassium carbonate and the benzene removed, leaving an oil (13.9 g.). This was dissolved in ether and treated with dry hydrogen chloride, giving 12.4 g. of 4:4-diphenyl-6-morpholinoheptan-3-one hydrochloride, which melted at 219–221° after crystallisation from a mixture of alcohol and ether. (Found: C, 70.8; H, 7.7; N, 3.6; Cl, 9.2. $C_{23}H_{29}O_2NHCl$ requires C, 71.2; H,7.8; N, 3.6; Cl, 9.1%.)

The above starting material, 2:2-diphenyl-4-morpholinovaleronitrile, may be prepared as follows: Diphenylacetonitrile (9.7 g.) is converted into its sodium derivative by treatment with sodamide (2.0 g.) in benzene (75 c. c.). 1-bromo-2.chloropropane (7.9 g.) is added to the suspension, and the latter is boiled under reflux, with stirring, for 2 hours. The cooled solution is washed with dilute hydrochloric acid and then with sodium bicarbonate solution, and dried over calcium chloride. After removal of the benzene, the residue is distilled, giving 2:2-diphenyl-4-chlorovaleronitrile (6.4 g.), B. P. 115–120°/0.0003 mms. This product (2.0 g.) is heated with morpholine (10 c. c.) in a sealed tube at 150° C. for 6 hours. The product is diluted with ether, and the ether solution is extracted with 2 N-hydrochloric acid. The acid extract is made strongly alkaline with 40% sodium hydroxide, and the oil is extracted with ether. Upon removal of the ether from the ether extract there is obtained 2:2-diphenyl-4-morpholinovaleronitrile (0.5 g.) melting at 108–9° C. after crystallization from petrol (B. P. 60–80°).

The above compound was found to have a desirably low toxicity and to possess valuable analgesic properties.

The hydrobromide was prepared by dissolving the hydrochloride in a little hot water containing a trace of hydrochloric acid and adding a slight excess of potassium bromide solution. The hydrobromide separated on cooling and was crystallised from water containing a trace of hydrobromic acid; it melted at 230–1°. (Found: N, 3.4; Br, 18.9. $C_{23}H_{29}O_2N.HBr$ requires N, 3.2; Br, 18.5%.)

The hydriodide was prepared similarly from the hydrochloride and potassium iodide. It crystallised from water as a monohydrate, which was not dehydrated at 100°/15 mms. The salt started to melt at 158°, but partially resolidified on further heating and melted finally, with decomposition, at 195–7°. (Found: C, 56.2; H, 6.75; N, 2.95; I, 24.8. $C_{23}H_{29}O_2N.HI.H_2O$ requires C, 55.5; H, 6.5; N, 2.8; I, 25.5%.)

The free ketone in pure form melted at 75–76.5°. (Found: C, 78.5; H, 8.0; N, 4.4. $C_{23}H_{29}O_2N$ requires C, 78.6; H, 8.3; N, 4.0%.)

The following salts were prepared from the free base by treatment with the appropriate acid in alcoholic solution and addition of ether.

Nitrate, M. P. 172° after crystallisation from a mixture of alcohol and ether. (Found: C, 66.7; H, 7.25; N, 6.6. $C_{23}H_{29}O_2N.HNO_3$ requires C, 66.6; H. 7.3; N, 6.8%.)

Sulphate, M. P. 156–165° after crystallisation from a mixture of alcohol and ether. (Found: C, 60.7; H, 7.6; N, 2.9; S, 6.4. $C_{23}H_{29}O_2N.H_2SO_4$ requires C, 61.4; H, 6.95; N, 3.1; S, 7.1%.)

*(b) From a mixture of 2:2-diphenyl-4-morpholinovaleronitrile and 2:2-diphenyl-3-methyl-4-morpholinobutyronitrile*

A mixture of 2:2-diphenyl-4-morpholinovaleronitrile and 2:2-diphenyl-3-methyl-4-morpholinobutyronitrile, roughly in the proportion 3 parts of the former to 2 of the latter was obtained by reaction of 1-morpholino-2-chloropropane with diphenylacetonitrile in the presence of sodamide. The mixture (170 g.) was dissolved in dry toluene (600 c. c.) and the solution was added to a Grignard reagent prepared from magnesium (25.7 g.) and ethyl iodide (167.4 g.) in dry ether (ca. 250 c. c.). The ether was distilled off, and the residue was heated overnight on the water-bath. The complex was decomposed cautiously with 5 N-hydrochloric acid (1 l.) and the mixture was heated on the water-bath for 30 minutes. After cooling in the refrigerator, the toluene and acid layers were carefully decanted from the lowest oily layer, which was basified by warming on the waterbath with 40% sodium hydroxide.. The resulting oil was extracted with benzene, the extract dried over potassium carbonate and the benzene removed, leaving a viscous oil (133 g.).

The crude material (644 g.) obtained from several such experiments was dissolved in alcohol (250 c. c.) and treated with a slight excess of alcoholic hydrogen chloride. The alcohol was distilled off, and the residue was boiled under reflux with benzene (1400 c. c.) for 1 hour. The hot solution was filtered and the solid was extracted with a further quantity of boiling benzene (800 c. c.). The residual solid (364 g.) was boiled with acetonitrile (170 c. c.), a quantity of insoluble material was filtered off and the filtrate was decolourised with charcoal and cooled. The solid which separated was crystallised further from acetonitrile, giving 218 g. of 4:4-diphenyl-6-morpholinoheptan-3-one hydrochloride, M. P. 222–8°.

That this compound had the structure stated was shown by its identity with material prepared from pure 2:2-diphenyl-4-morpholinovaleronitrile (see Example (*a*)) which has itself been prepared by an unambiguous method.

In the above example, ethyl iodide could be replaced by ethyl bromide, but in this case, a greater proportion of the product remained in the aqueous layer after decomposition of the Grignard complex, and it was necessary to recover this material by treatment of the aqueous layer with excess alkali and extraction with benzene.

We claim:

1. Water-soluble acid addition salts of 4,4-diphenyl-6-morpholinoheptan-3-one.

2. 4 : 4 - diphenyl - 6 - morpholinoheptan - 3 - one sulphate.

3. 4,4 - diphenyl - 6 - morpholino - heptanone - 3-hydrochloride.

BENJAMIN ARTHUR HEMS.
JOSEPH ELKS.

REFERENCES CITED

The following references are of record in the file of this patent:

FOREIGN PATENTS

| Number | Country | Date |
|---|---|---|
| 61,463 | Denmark | Oct. 25, 1943 |

OTHER REFERENCES

Office of the Publication Board, Report No. 981, pages 91–92—(film released July 1945).